US008562425B2

(12) United States Patent
Englman et al.

(10) Patent No.: US 8,562,425 B2

(45) Date of Patent: Oct. 22, 2013

(54) WAGERING GAME WITH ENHANCED WAGER-PER-LINE FEATURE

(75) Inventors: Allon G. Englman, Chicago, IL (US); Jeremy M. Hornik, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 1119 days.

(21) Appl. No.: 12/492,899

(22) Filed: Jun. 26, 2009

(65) Prior Publication Data

US 2009/0325681 A1 Dec. 31, 2009

Related U.S. Application Data

(60) Provisional application No. 61/133,281, filed on Jun. 27, 2008.

(51) Int. Cl.
*A63F 13/00* (2006.01)

(52) U.S. Cl.
USPC .................................. 463/25; 463/16; 463/20

(58) Field of Classification Search
USPC ................................................ 463/16, 20, 25
See application file for complete search history.

(56) References Cited

U.S. PATENT DOCUMENTS

| | | | | |
|---|---|---|---|---|
| 5,033,744 | A * | 7/1991 | Bridgeman et al. | 463/13 |
| 5,277,424 | A | 1/1994 | Wilms | 273/85 |
| 5,743,799 | A | 4/1998 | Houriet, Jr. et al. | 463/25 |
| 5,769,716 | A * | 6/1998 | Saffari et al. | 463/20 |
| 5,976,016 | A | 11/1999 | Moody et al. | 463/13 |
| 6,068,552 | A | 5/2000 | Walker et al. | 463/21 |
| 6,135,453 | A | 10/2000 | Srichayaporn | 273/292 |
| 6,312,334 | B1 | 11/2001 | Yoseloff | 463/25 |
| 6,386,974 | B1 | 5/2002 | Adams | 463/16 |
| 6,394,902 | B1 | 5/2002 | Glavich et al. | 463/20 |
| 6,582,303 | B1 * | 6/2003 | Weiss | 463/16 |
| 6,685,559 | B2 | 2/2004 | Luciano et al. | 463/16 |
| 6,709,331 | B2 | 3/2004 | Berman | 463/16 |
| 7,128,646 | B2 * | 10/2006 | Baerlocher et al. | 463/16 |

(Continued)

FOREIGN PATENT DOCUMENTS

| | | |
|---|---|---|
| AU | 759712 | 4/2003 |
| AU | 770083 | 2/2004 |
| WO | WO 2008/021175 | 2/2008 |

OTHER PUBLICATIONS

ITV Casino—Games—Gone With the Wind, Apr. 23, 2009; pp. 1-8.

(Continued)

*Primary Examiner* — William H McCulloch, Jr.

(74) *Attorney, Agent, or Firm* — Nixon Peabody LLP

(57) ABSTRACT

A gaming machine for conducting a wagering game by a player includes a display, a credit indicator and a controller. The display is for displaying a wagering-game outcome having a plurality of symbols arranged in an array. The array includes a plurality of paylines for indicating symbol combinations in the array. The player is required to play all of the plurality of paylines in exchange for a minimum wager amount. The credit indicator indicates the number of available credits for making a wager amount. The controller is in communication with the display and the credit indicator. In response to the number of available credits being less than the minimum wager amount, the controller causes the display to display a group of player options for allowing the player to select a disposition for the available credits. The group of player options includes a reduced-payline option to play less than all paylines for a subsequent wagering-game outcome.

20 Claims, 8 Drawing Sheets

(56) References Cited

U.S. PATENT DOCUMENTS

| | | | | |
|---|---|---|---|---|
| 7,241,221 | B1 * | 7/2007 | Luciano et al. | 463/20 |
| 7,351,146 | B2 * | 4/2008 | Kaminkow | 463/25 |
| 7,488,251 | B2 * | 2/2009 | Kaminkow | 463/25 |
| 7,618,319 | B2 * | 11/2009 | Casey et al. | 463/25 |
| 7,651,393 | B2 * | 1/2010 | Okada et al. | 463/20 |
| 7,798,898 | B2 * | 9/2010 | Luciano et al. | 463/25 |
| 7,901,294 | B2 * | 3/2011 | Walker et al. | 463/42 |
| 7,922,571 | B2 * | 4/2011 | Walker et al. | 463/13 |
| 7,931,531 | B2 * | 4/2011 | Oberberger | 463/25 |
| 7,950,993 | B2 * | 5/2011 | Oberberger | 463/16 |
| 7,997,980 | B2 * | 8/2011 | Luciano et al. | 463/25 |
| 8,109,826 | B2 * | 2/2012 | Luciano et al. | 463/25 |
| 8,131,829 | B2 * | 3/2012 | Deng | 709/221 |
| 8,162,742 | B2 * | 4/2012 | Oberberger | 463/20 |
| 8,172,663 | B2 * | 5/2012 | Olive | 463/20 |
| 8,430,735 | B2 * | 4/2013 | Oberberger | 463/16 |
| 2002/0077171 | A1 * | 6/2002 | Ainsworth | 463/20 |
| 2003/0069068 | A1 * | 4/2003 | Kaminkow | 463/25 |
| 2003/0130027 | A1 * | 7/2003 | Aida | 463/20 |
| 2004/0014522 | A1 * | 1/2004 | Walker et al. | 463/25 |
| 2005/0026676 | A1 * | 2/2005 | Olive | 463/20 |
| 2005/0049731 | A1 | 3/2005 | Dell | 700/91 |
| 2006/0025215 | A1 | 2/2006 | Thomas | 463/20 |
| 2006/0246981 | A1 * | 11/2006 | Walker et al. | 463/13 |
| 2007/0135204 | A1 * | 6/2007 | Nicely | 463/17 |
| 2008/0015008 | A1 * | 1/2008 | Luciano et al. | 463/20 |
| 2008/0108406 | A1 * | 5/2008 | Oberberger | 463/16 |
| 2008/0108425 | A1 * | 5/2008 | Oberberger | 463/25 |
| 2008/0167105 | A1 * | 7/2008 | Kaminkow | 463/13 |
| 2008/0214280 | A1 * | 9/2008 | Baerlocher | 463/20 |
| 2009/0143133 | A1 * | 6/2009 | Baerlocher | 463/20 |
| 2009/0183243 | A1 * | 7/2009 | Ruppert et al. | 726/5 |
| 2009/0325681 | A1 * | 12/2009 | Englman et al. | 463/20 |
| 2011/0201413 | A1 * | 8/2011 | Oberberger | 463/25 |
| 2012/0184360 | A1 * | 7/2012 | Baerlocher | 463/25 |
| 2012/0190426 | A1 * | 7/2012 | Acres | 463/20 |
| 2012/0208628 | A1 * | 8/2012 | Oberberger | 463/26 |
| 2012/0331048 | A1 * | 12/2012 | Atashband et al. | 709/203 |
| 2013/0029756 | A1 * | 1/2013 | Slomiany et al. | 463/25 |

OTHER PUBLICATIONS

Find Out How to Play the Shipwreck Slot Machine Game with PartyCasino.com!; Apr. 23, 2009; pp. 1-5.

* cited by examiner

WAGERING GAME WITH ENHANCED WAGER-PER-LINE FEATURE

CROSS-REFERENCE TO RELATED APPLICATIONS

This application claims the benefit of U.S. Provisional Application No. 61/133,281, filed Jun. 27, 2008, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to wagering games with a group of player options upon the occurrence of an event.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

One wagering game feature that has become more popular for players and gaming establishments are games that contain numerous paylines that must be played by the player. These games permit numerous ways for the player to win, which is exciting for the player. Additionally, the casino achieves the benefit of having higher wagering levels in the gaming machine. One problem in these types of wagering games occurs when the player's available credits falls below the minimum credit amount required to play all of the paylines. The present invention helps to solve that problem.

SUMMARY OF THE INVENTION

According to one aspect of the present invention, a gaming machine for conducting a wagering game by a player includes a display, a credit indicator and a controller. The display is for displaying a wagering-game outcome having a plurality of symbols arranged in an array. The array includes a plurality of paylines for indicating symbol combinations in the array. The player is required to play all of the plurality of paylines in exchange for a minimum wager amount. The credit indicator indicates the number of available credits for making a wager amount. The controller is in communication with the display and the credit indicator. In response to the number of available credits being less than the minimum wager amount, the controller causes the display to display a group of player options for allowing the player to select a disposition for the available credits. The group of player options includes a reduced-payline option to play less than all paylines for a subsequent wagering-game outcome.

Another aspect of the present invention involves a method of conducting a wagering game that includes a plurality of symbols arranged in an array and a plurality of paylines for indicating symbol combinations in the array. In a first play of the wagering game, the method includes the act of requiring a player to wager a minimum wager amount corresponding to all of the plurality of paylines. The method further includes the acts of displaying a plurality of symbols randomly arranged in the array and indicating an outcome of the first play of the wagering game. In response to the outcome of the first play being a winning outcome, the method includes the act of providing an award to the player. In response to a player's available credits being less than the minimum wager amount corresponding to the plurality of paylines and prior to a second play of the wagering game, the method includes the act of displaying a group of player options for allowing the player to select a disposition for the available credits. The group of player options includes an option to play less than all paylines for the second play of the wagering game.

A further aspect of the present invention involves a method of conducting a wagering game that includes a plurality of symbols arranged in an array and a plurality of paylines for indicating symbol combinations in the array. In a first play of the wagering game, the method includes the act of requiring a player to wager a minimum wager amount corresponding to a wager on all of the plurality of paylines. The method further includes the acts of displaying a plurality of symbols randomly arranged in the array and indicating an outcome of the first play of the wagering game. In response to the outcome being a winning outcome in the first play of the wagering game, the method includes the act of providing an award to the player. In response to a player's available credits being less than the minimum wager amount corresponding to the plurality of paylines and prior to a second play of the wagering game, the method includes the act of providing a player with at least the options to (i) cash out the player's available credits and (ii) wager the available credits on a reduced number of paylines in the second play.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
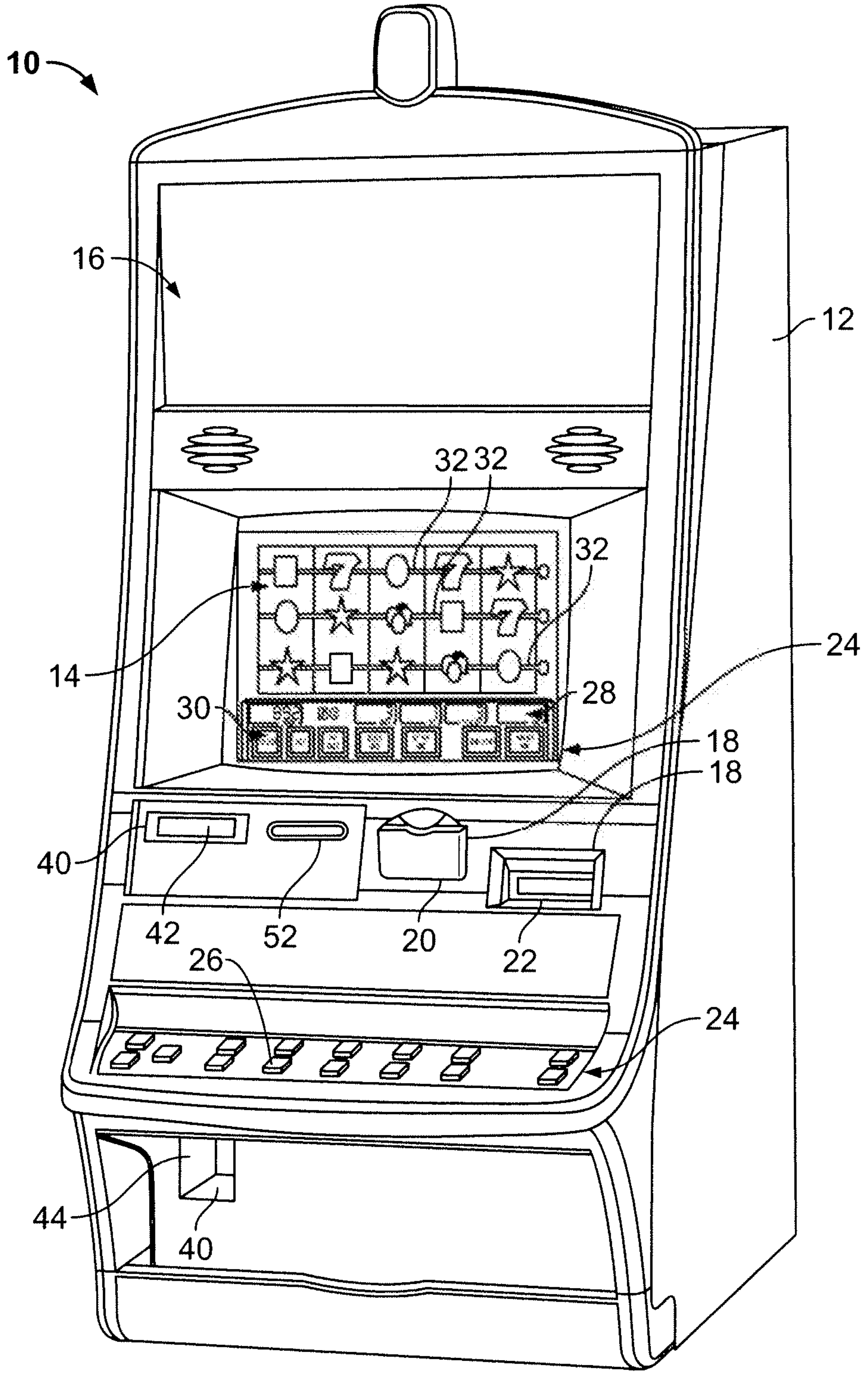
FIG. 1*a* is a perspective view of a free standing gaming machine embodying the present invention.

While this invention is susceptible of aspects and embodiments in many different forms, there is shown in the drawings and will herein be described in detail preferred aspects and embodiments of the invention with the understanding that the present disclosure is to be considered as an exemplification of the principles of the invention and is not intended to limit the broad aspect of the invention to the aspects and embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes user interfaces or input devices, including a value input device 18 and a player input device 24. For output the gaming machine 10 includes a primary display 14 for displaying information about the basic wagering game. The primary display 14 can also display information about a bonus wagering game, a progressive wagering game, and/or player options. The gaming machine 10 may also include a secondary display 16 for displaying game events, game outcomes, player options and/or signage information. While these typical components found in the gaming machine 10 are described below, it should be understood that numerous other elements may exist and may be used in any number of combinations to create various forms of a gaming machine 10.

The value input device 18 or user interface may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a video display, such as a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In FIG. 1*a*, the gaming machine 10 is an “upright” version in which the primary display 14 is oriented vertically relative to the player. Alternatively, the gaming machine may be a “slant-top” version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer-readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
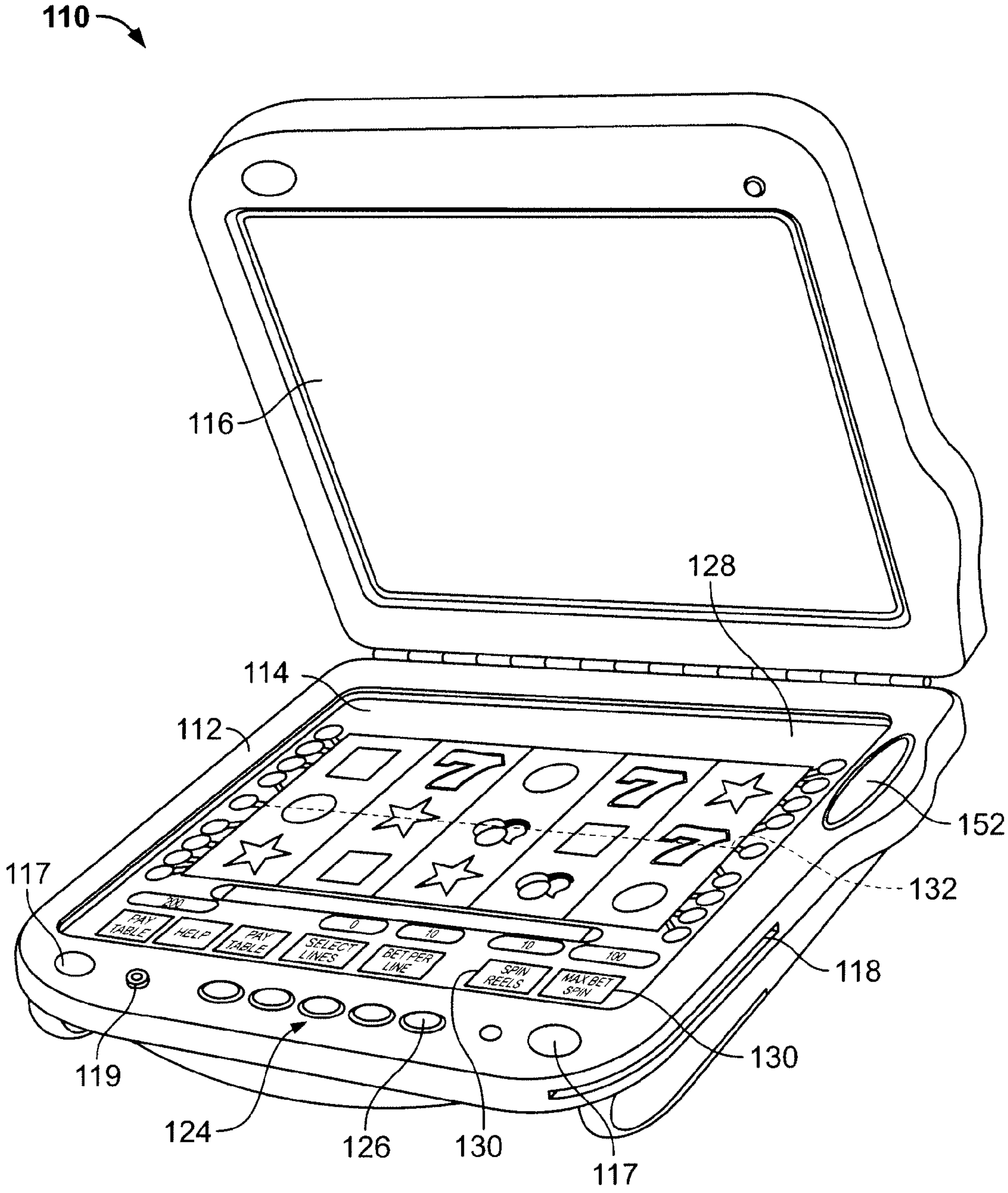
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or the secondary display 116 may be configured to display any aspect of a non-wagering game, wagering game, secondary games, player options, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or the secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer-readable storage medium interface. In some aspects, the player information reader 152, shown by way of example in FIG. 1*b*, comprises a biometric sensing device.

Figure 2:
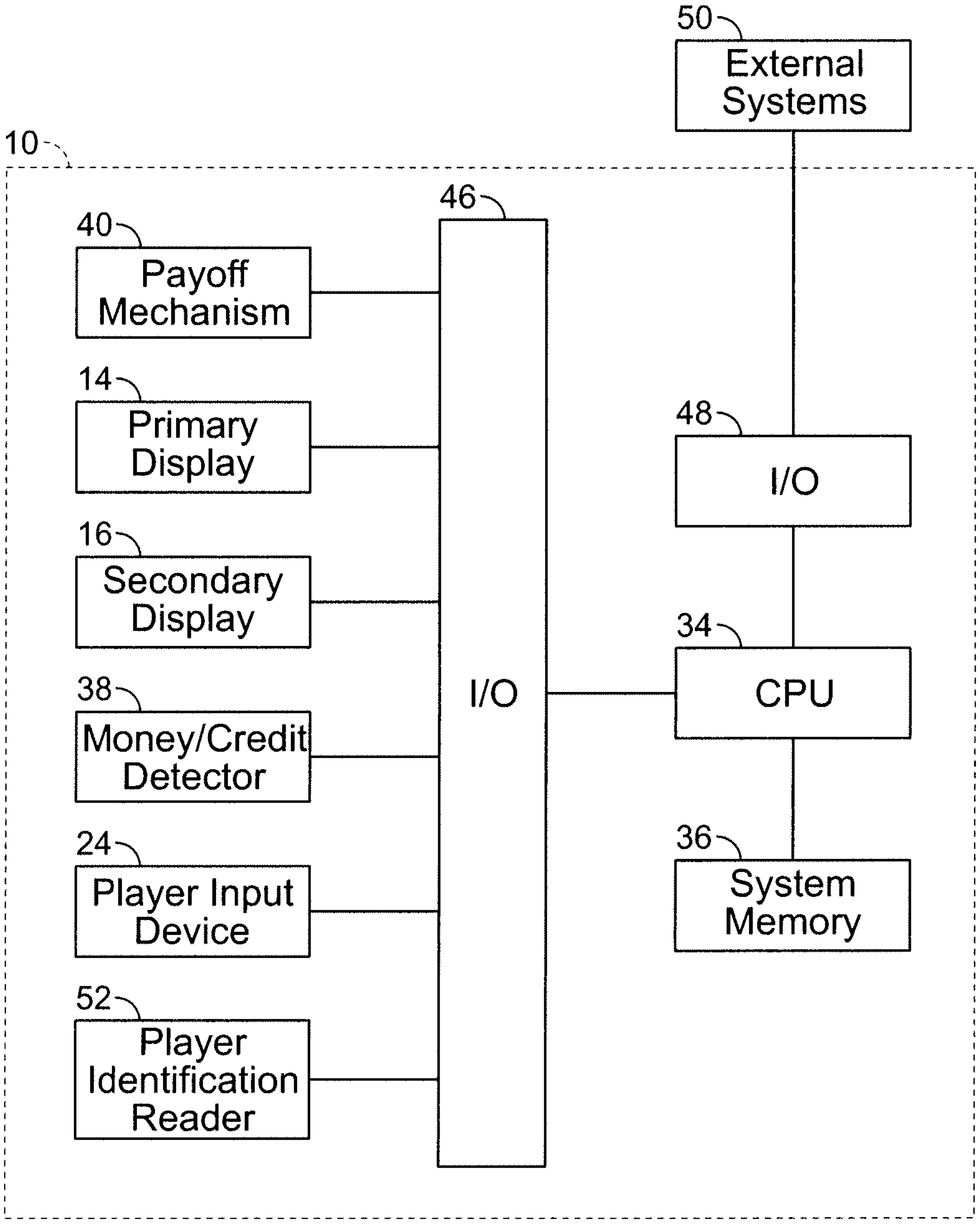
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine (e.g., 10, 110) executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

Figure 3:
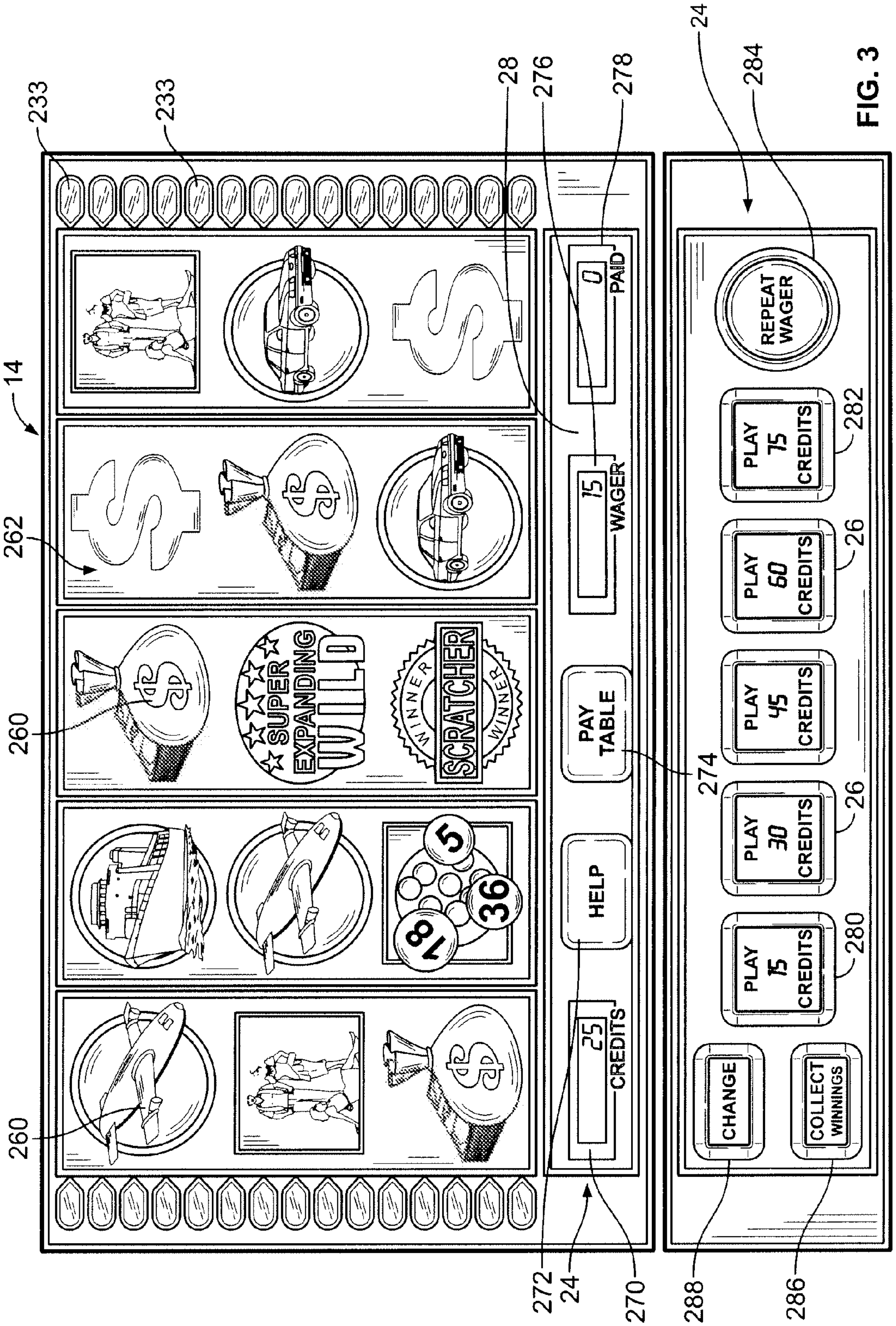
FIG. 3 is a front view of a primary display and player input devices according to some aspects.

Turning now to FIG. 3, the primary display 14 is configured to display a plurality of symbols 260 in an array. The plurality of symbols 260 are located on a plurality of reels 262. As shown, the primary display 14 is a video display with virtual reels 262. Alternatively, the primary display 14 can be a mechanical reel-type display with an overlying transmissive display or other video overlay technology. These devices can help to provide for the pop-up window having player options when his or her credits are below the minimum wager, as described below. For information regarding the use of video overlay technology in gaming machines and for embodiments employing video overlay displays, the reader is referred to commonly assigned U.S. Published Application No. 20040198485, titled "Gaming Machine with Superimposed Display Image," filed on Nov. 7, 2003, and also to commonly-assigned U.S. Pat. No. 6,517,433, titled "Reel Spinning slot Machine With Superimposed Video Image," issued on Feb. 11, 2003, each of which being incorporated herein by reference in its entirety.

The gaming machine 10 includes two player input devices 24 or user interfaces. The first player input device 24 includes the touch screen portion 28. The touch screen portion 28 includes a credit indicator 270, one or more of the soft touch keys 30, a wager amount indictor 276, and a paid amount indicator 278. The soft touch keys 30 can include a help key 272 and/or a pay table key 274. A player of the gaming machine 10 can activate the help key 272 by pressing the touch screen 28 in the area of the help key 272. Once a player activates one of the soft touch keys 30, the primary display 14 typically displays information relating to the activated button. For example, if a player presses the pay table key 274, the primary display 14 displays payout information relating to various winning symbol combinations. Various other combinations of soft touch keys 30 and indicators (e.g., 270, 276, 278) are also contemplated. For example, the first player input device 24 or user interface can include a spin reels soft touch key and/or a maximum wager spin soft touch key.

The second player input device 24 or user interface includes the plurality of push buttons 26. As shown, the second player input device 24 includes a plurality of wager-amount-selection buttons. Examples of wager-amount-selection buttons include a minimum wager push button 280, a maximum wager push button 282, and a plurality of additional wager push buttons corresponding to intermediate wagers. The additional wager push buttons can be for wagering different credit multiples on each available payline 32. For example, the basic wagering game of FIG. 3 contains fifteen paylines 32. Thus, if the gaming machine 10 has five wager push buttons, their wager amounts can be fifteen credits (minimum), thirty credits (intermediate), forty-five credits (intermediate), sixty credits (intermediate), and seventy-five credits (maximum). When the player selects a higher wager amount, the player can obtain winning outcomes with higher payouts.

The second player input device 24 can also include a repeat wager push button 284, a collect winnings push button 286, and a change indicator light 288. Various combinations and orientations of the push buttons are also contemplated.

A player begins play of a basic wagering game by inserting currency and/or credits via the value input device 18 or user interface. Using the player input device 24, the player selects a wager amount via the push buttons 26. The wager amount is equal to one of the five possible wager selections (e.g., 15, 30, 45, 60, or 75 credits), which respectively corresponds with one of the five wager-amount-selection buttons. In response to the player's wager selection, the controller 34 causes the reels 262 to spin so as to rearrange the plurality of symbols 260 to display a randomly selected outcome. If any of the fifteen paylines indicates a winning symbol combination, an award is provided.

The primary display 14 includes a plurality of payline indicators 233 for indicating a status of a payline (e.g., payline 32, 132). The status of the payline 32 can be active (e.g., on) or inactive (e.g., off). As shown in FIG. 3, the primary display 14 contains fifteen pairs of payline indicators 233. Each pair of payline indicators 233 corresponds to a specific payline 32. Alternatively, the display can include a single payline indicator 233 for each payline 32, similar to the configuration shown in FIG. 1*a*.

In the gaming machine 10, a particular mode of operation requires that all of the paylines are active for the basic wagering game. A player, in this wager-on-all-paylines mode of operation, is required to wager on all of the paylines 32. Thus, the player cannot select specific paylines 32 to play. For example, in FIG. 3, there are fifteen pairs of payline indicators 233 that correspond to fifteen paylines 32. In this example, the player must wager on all fifteen paylines. In the present example (shown in FIG. 3), because there are fifteen available paylines 32, the minimum wager amount is fifteen credits such that a minimum of one credit is wagered on each of the required fifteen paylines for any given play of the basic wagering game.

According to one example, a player begins play of the gaming machine 10 by inserting 100 credits into, for example, a user interface. After a combination of several winning and/or losing outcomes, the player's available credits are now 25 credits (i.e., overall, the player has lost 75 credits), as depicted in the credit indicator 270 of FIG. 3. Referring to the second player input device 24, the player selects the minimum wager push button 280 to wager the minimum amount of credits (e.g., 15 credits). The wager amount indictor 276 displays that the current total wager is fifteen credits. In accordance with the wager-on-all-paylines mode of operation, the fifteen credits are equally wagered, one credit per payline, on all fifteen paylines 32. The controller 34 then causes the reels 262 to spin on the primary display 14, thereby rearranging the plurality of symbols 260 into a different random array. The resulting random array of the plurality of symbols 260 may result in either winning outcomes or losing outcomes on the fifteen paylines. In the case of a winning outcome, the controller 34 instructs the payoff mechanism 40 to provide a credit award to the player in response to the winning outcome.

Figure 4:
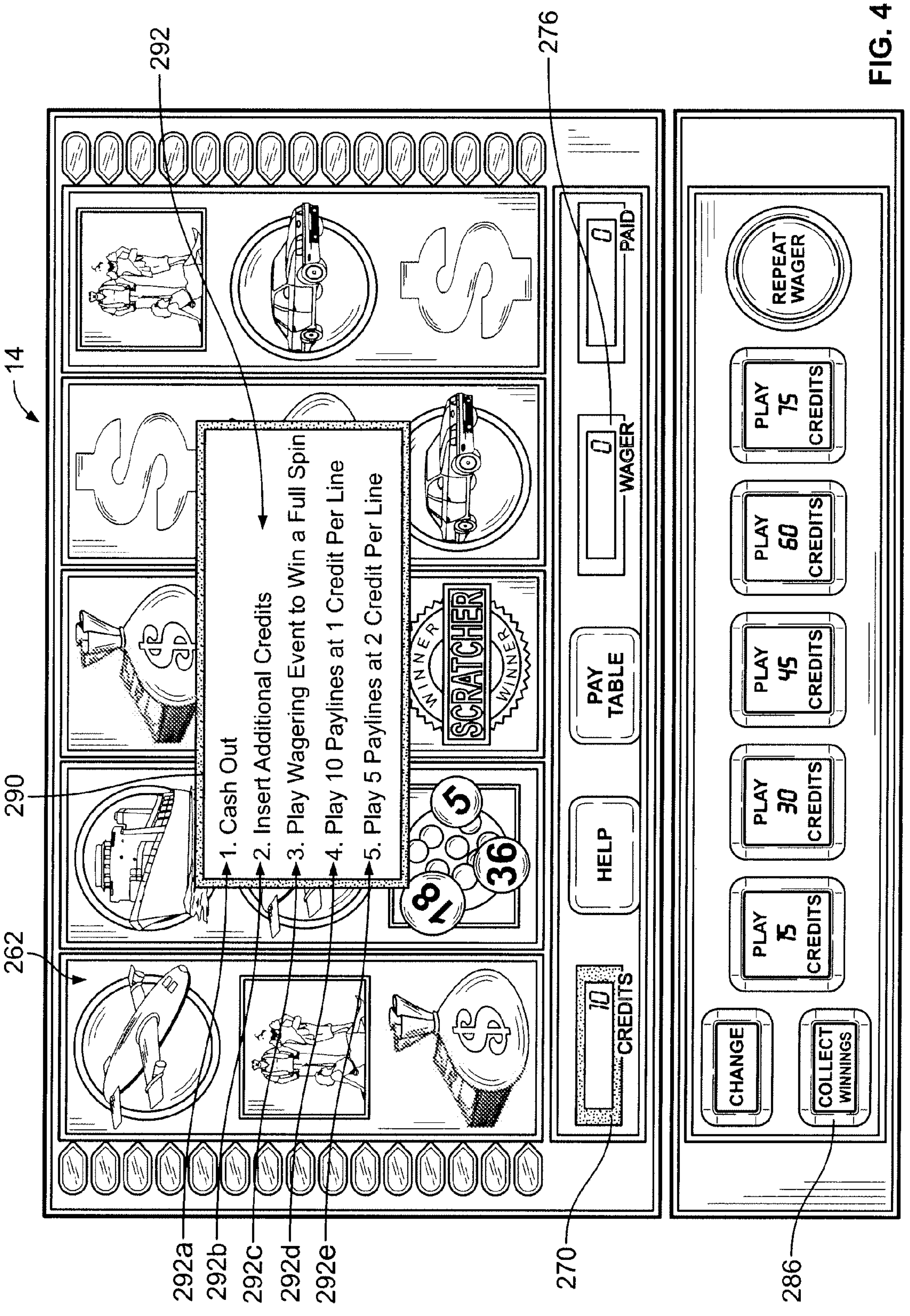
FIG. 4 is a front view of the primary display of FIG. 3 further displaying a group of player options according to some aspects.

Referring to the example depicted in FIGS. 3 and 4, in the case of losing outcomes on the fifteen paylines, the controller 34 reduces the player's available credits from 25 credits to 10 credits, as shown in the credit indictor 270 of FIG. 4. Thus, the player's available credits, in this example, are now less than the minimum wager amount (e.g., 15 credits) required by the gaming machine 10 in the wager-on-all-paylines mode of operation.

When a player's available credits falls below the minimum wager amount, one of at least three scenarios may occur: the player can (1) press the collect winnings push button 286 to receive the ten remaining credits; (2) insert additional credits to continue playing; or (3) select a player option 292 in a popup window 290. Regarding the third option, as depicted in FIG. 4, the controller causes the primary display 14 to display the popup window 290 with a group of player options 292 for allowing the player to select a disposition for the available credits. The plurality of player options 292 may include, but are not limited to, a cash-out option 292*a*, an insert-additional-credits option 292*b*, a wagering-event option 292*c*, a reduced-payline option 292*d,e*, and/or any combinations thereof.

The entire primary display 14 can be a touch screen such that the player may select a particular option 292 by touching the player option 292 directly on the primary display 14. Alternatively, the gaming machine 10 may include option selection buttons (e.g., push buttons) on other types of player input devices.

The cash-out option 292*a* can be selected and/or performed by the player. The player presses the cash-out option 292*a* in the popup window 290, which results in the same disposition of the remaining 10 available credits as is he or she had pressed the collect winnings push button 286.

The insert-additional-credits option 292*b* can be selected and/or performed by the player. The player presses the insert-additional-credits option 292*b* in the popup window 290. The controller 34 then displays an instruction to the player to add currency and/or credits in the value input device 18 before continuing play. Typically, the player may add additional currency and/or credits into the value input device 18 at any time during use of the gaming machine 10.

Figure 5:
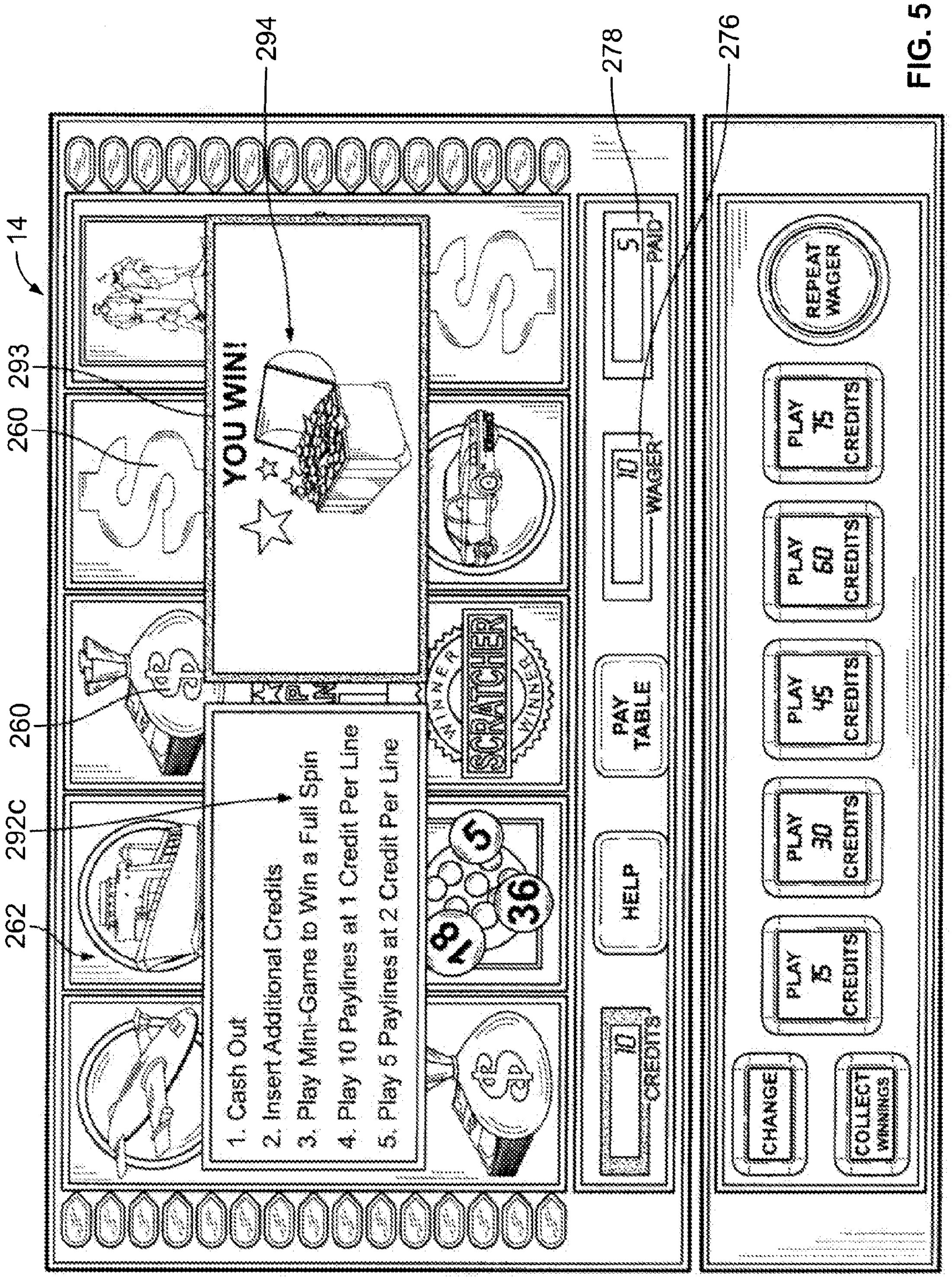
FIG. 5 is a front view of the primary display of FIG. 4 further displaying a wagering event according to some aspects.

In addition to the two aforementioned options 292*a* and 292*b*, the player can also select the wagering-event option 292*c* by pressing the option on the primary display 14, which is described relative to FIG. 5. Alternatively, the player may select one of the reduced-payline options 292*d,e*, which is described relative to FIG. 6.

Referring to FIG. 5, after the player selects the wagering-event option 292*c*, a second popup window 293 appears on the primary display 14. The wagering event can be a simple wager in which the probability of winning (e.g., winning a full spin at the minimum wager amount) is based on the number of available credits relative to the minimum wager amount. For example, if a player has ten available credits, but the minimum wager amount for the basic wagering game is fifteen credits, then the player would have a 10/15 (66%) chance of winning a full play of the basic wagering game at the minimum wager amount.

In the present example, the player selected the wagering-event option 292*c*, thereby wagering the ten available credits (shown in the wager amount indicator 276) for a chance to win five credits. In this example, the player's wager resulted in a winning outcome 294, displayed in the second popup window 293. Thus, the player won a full spin in which the amount of credits necessary for the full spin is fifteen credits (e.g., the minimum wager amount). In other words, the player won five credits, as shown in the paid amount indicator 278. In the illustrated embodiment, a random number generator (perhaps associated with the CPU 34) determines whether the player has won the right to play the basic wagering game at one credit per payline or lost the remaining 10 credits.

In a preferred embodiment, the player does not, however, win fifteen redeemable credits (e.g., the player cannot now cash-out the fifteen available credits). Rather, the player must play the basic wagering game at fifteen credits such that the controller 34 causes the reels 262 to spin to rearrange the plurality of symbols 260 to display a different randomly selected outcome with one credit being wagered on each of the fifteen paylines 32. If this play of the basic wagering game results in a winning outcome, then at that point the player can cash-out. If, however, this play of the basic wagering game results in a losing outcome, then the player losses the fifteen wagered credits and the player's available credits becomes zero.

In another example, a player has five available credits and selects the wagering-event option 292*c*. Because the minimum wager amount for the basic wagering game is fifteen credits, the player would have a 5/15 (33%) chance of winning a full play of the basic wagering game at the minimum wager amount. If the player obtains a winning outcome, then that player will have won an additional ten credits, for a total of fifteen credits, which must be wagered in the basic wagering game in accordance with the wager-on-all-paylines mode of operation as described above.

As an alternative to the wagering-event option 292*c* shown in FIG. 5 in which the player is just presented with a winning outcome 294 or a losing outcome, the player can participate in the wagering event, such as being presented with a set of fifteen symbols. Each of the fifteen symbols has a winning outcome indicator (similar to winning outcome 294) or a losing outcome indicator hidden behind the symbol. Thus, the player has the opportunity to decide which symbol to select to reveal either a winning or a losing outcome. In an example where a player has ten available credits, a winning outcome indicator is hidden behind ten of the fifteen symbols and a losing outcome indicator is hidden behind the remaining five symbols. This type of wagering event gives the player the perception of more control over the wagering event, which adds more excitement to the game.

It is contemplated that a winning outcome of the wagering-event option 292*c* can award more than just enough credits to allow the player to make the minimum wager amount. For example, the winning outcome of the wagering event can provide the player with enough credits to make two wagers at the minimum wager amount. The award of credits can be based on, for example, a player's gaming status, time of play, amount of initial wager, amount of total wager, etc.

In an alternative embodiment, the player can be allowed to cash-out after a winning outcome of the wagering-event option 292*c*. For example, in the above illustrative example, the player essentially won an additional five credits, such that the total available credits were fifteen credits, thereby allowing the player just enough credits to make a minimum wager on the basic wagering game. Thus, in accordance with this alternative embodiment, the player may be allowed to redeem (e.g., cash-out) the fifteen credits, rather than being forced to play the basic wagering game in the wager-on-all-paylines mode of operation.

Figure 6:
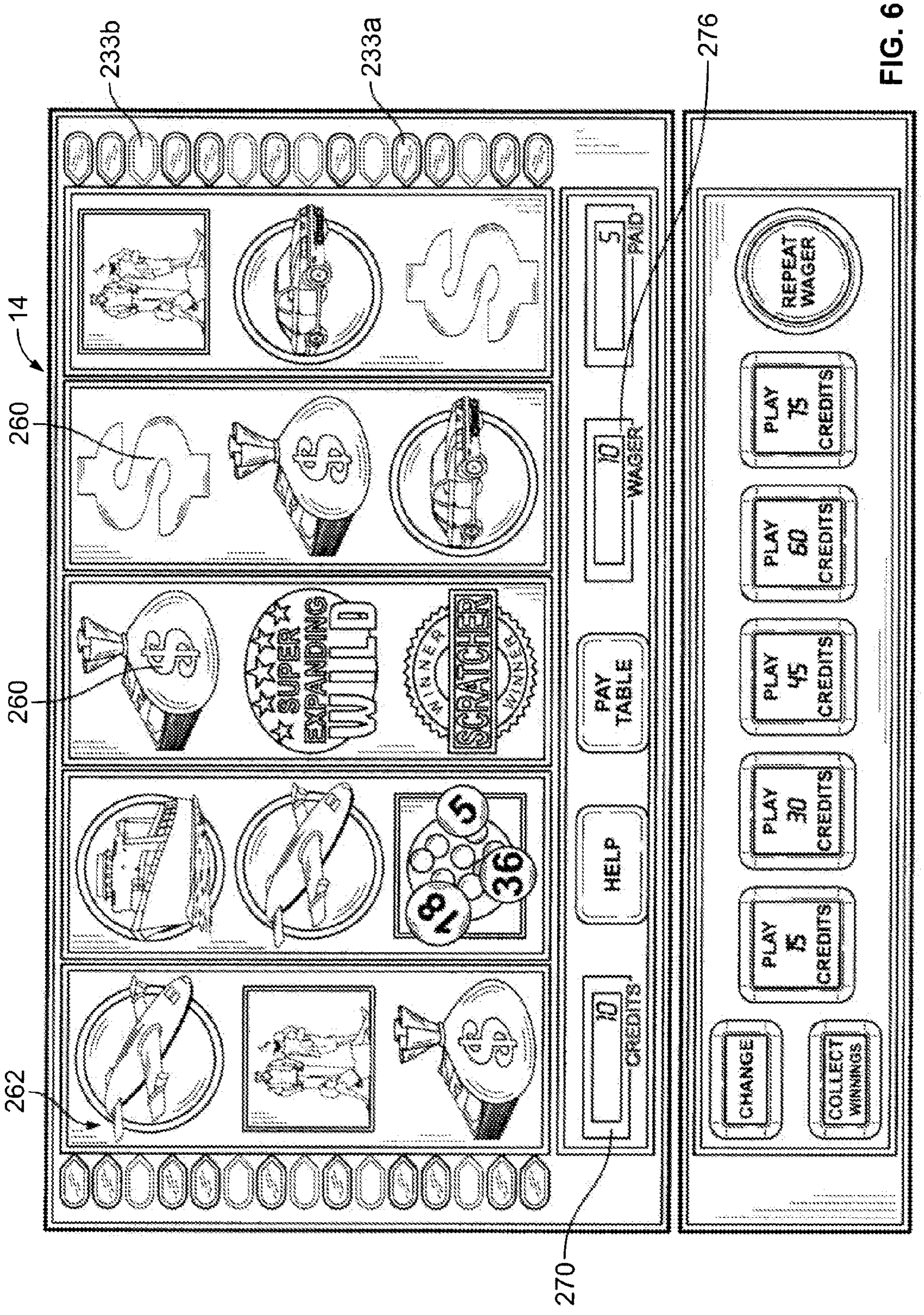
FIG. 6 is a front view of the primary display of FIG. 3 with a reduced number of active payline indicators for a reduced-payline option according to some aspects.

Referring now to FIG. 6, the player can select one of the reduced-payline options 292*d*, 292*e* in FIG. 4 by pressing the option on the primary display 14. Each of the reduced-payline options 292*d*, 292*e* require the player to wager all available credits on a reduced number of paylines on a wager-per-line basis that is equivalent to the available credits. Put another way, the player's remaining available credits are equally distributed among the reduced set of paylines. According to some aspects, after the player selects one of the reduced-payline option 292*d*, 292*e*, the controller 34 causes the reels 262 to spin, thereby rearranging the plurality of symbols 260 for indicating the outcome of the wagering game.

FIG. 6 shows the primary display 14 after selection of the reduced-payline option 292*d*, entitled "Play 10 Paylines at 1 Credit Per Line," shown in FIG. 4. While two reduced-payline options are shown in FIG. 4, only one reduced-payline option 292*d* will be discussed. The credit indicator 270 shows that ten credits are available for wagering. The wager amount indicator 276 shows that the player selected the reduced-payline option 292*d* resulting in a wager of ten credits. Even though during play of the basic wagering game the minimum wager amount is fifteen credits, this reduced-payline option 292*d* allows the player to temporarily wager the remaining ten credits on only ten paylines 32. The ten active paylines 32 are indicated by the active payline indicators 233*a* (e.g., light on, highlighted, etc.), as compared to the inactive paylines 32, which are indicated by the inactive payline indicators 233*b* (e.g., light off, or un-highlighted). Thus, instead of having to insert additional currency and/or credits, or cash-out, the player can be prompted (e.g., by the popup window 290) to select a reduced payline option.

The number of reduced paylines can be fixed (e.g., always five or ten) or variable. If variable, the number of reduced paylines can be depend on the number of available credits (e.g., seven paylines if seven available credits or three paylines if three available credits, etc.). For example, if the player only had five available credits, then the popup window 290 might be configured to only display one reduced payline option, where the player could play five paylines at one credit per line. Various other combinations of numbers of reduced paylines 32 and wagered credits per payline are contemplated. For example, if the player has nine available credits, the reduced-payline option could be nine paylines at one credit per payline and/or three paylines at three credits per payline.

While FIG. 4 shows that a player's reduced-payline options are limited to two fixed numbers of paylines (e.g., five and ten paylines), according to alternative embodiments, the reduced-payline option can be configured to allow the player to select a specific number of reduced paylines. The reduced-payline option can also be configured to allow the player to select which specific paylines to play during a reduced payline mode of operation. Additionally, while the reduced-payline options 292*d,e* require the player to wager all of the available credits for an opportunity to win a full spin, the reduced-payline options can alternatively allow the player to wager less than all of the available credits. For example, in a basic wagering game with a minimum wager of fifteen credits, if a player only has eight credits, then during play of the reduced-payline option the player can wager four of the eight credits on four paylines at one credit per payline.

In another embodiment, an option can be provided that allows the player to wager his remaining credits (which are less than the minimum number of credits necessary to properly bet on all lines) on the next spin. When this option is selected by the player, a percentage is calculated of the player's remaining credits to the minimum number of credits. The reels are spun, an outcome is determined, and if the outcome is an award outcome, the award outcome is multiplied by the calculated percentage to determine an award total to award the player.

Figure 7:
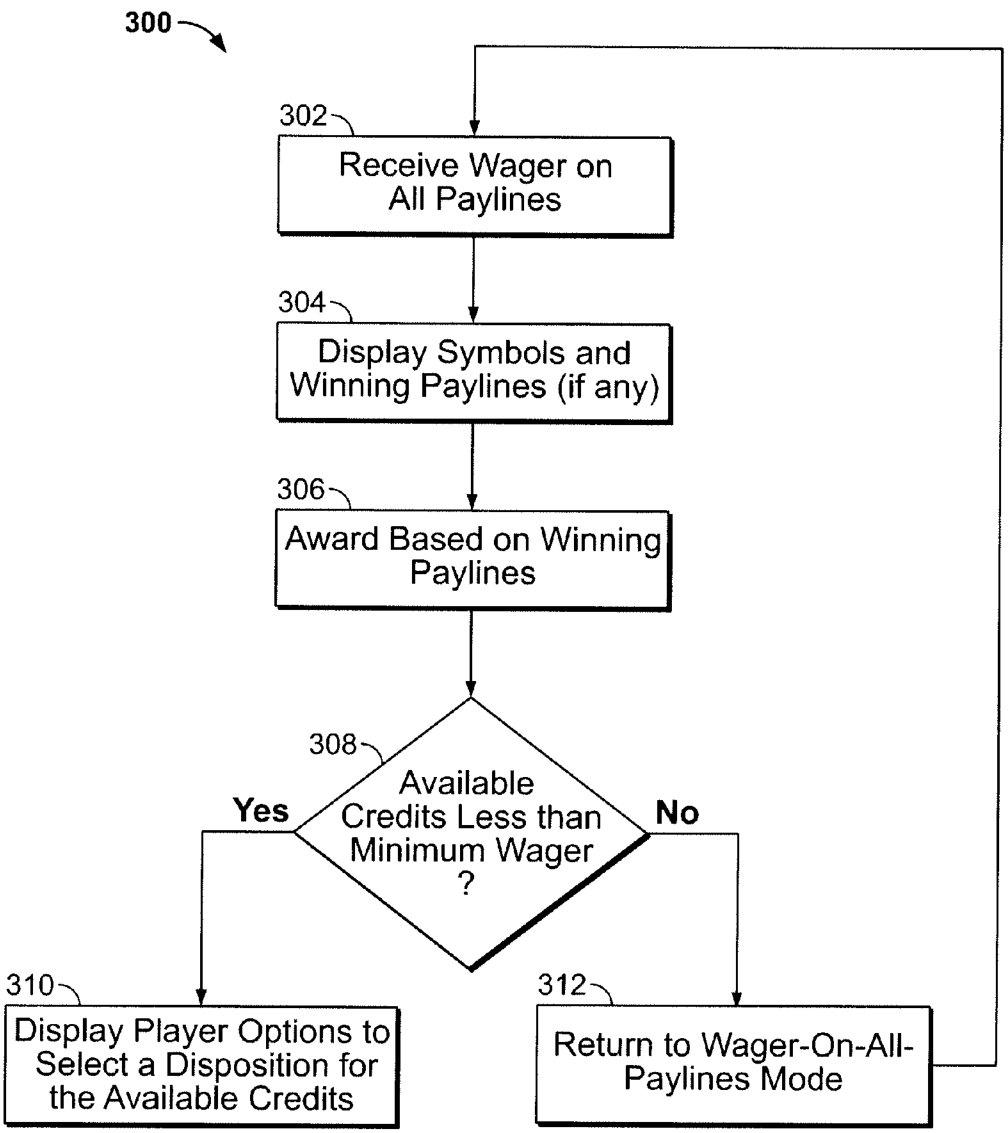
FIG. 7 is a flow chart for one possible algorithm that corresponds to instructions executed by a controller in accord with at least some aspects.

Now referring to FIG. 7, a flow chart 300 of one possible algorithm that corresponds to instructions executed by a controller (e.g., processor, microprocessor, CPU) for a basic wagering game is shown according to some aspects of the present invention. Initially, a player inserts currency and/or credits into a value input device (e.g., 18, 118) of a gaming machine (e.g., 10, 110). A money/credit detector (e.g., 38) signals the controller (e.g., 34) that money and/or credits have been input via the value input device. The player then makes a wager on all of the paylines as required in a wager-on-all-paylines mode of operation.

The controller receives a signal corresponding to the amount of the wager on all of the paylines (302). The controller then causes the primary display (e.g., 14, 114) to display an array of symbols and winning paylines, if any (304). If a winning outcome is detected, then the controller awards the player based on the winning payline(s) (306). After the outcome of each basic wagering game, the controller is configured to check if the available credits are less than the minimum wager amount (308). If the available credits are less than the minimum wager amount, then the controller displays a popup window (e.g., 290) with player options (e.g., 292*a-e*) for the player to select a disposition for the available credits (310). If the available credits are equal to or greater than the minimum wager amount (312), then the controller resumes the wager-on-all-paylines mode of operation.

It is contemplated that a computer-readable storage medium can be encoded with instructions for directing the gaming machine 10,110 to perform the acts as set forth in FIG. 7. Specifically, the computer-readable storage medium can be encoded with instructions readable by, for example, the CPU 34 such that the CPU 34 reads and executes the encoded instructions. The computer-readable storage medium may be the system memory 36 or a memory device located outside the gaming machine.

Each of these aspects, embodiments, and obvious variations thereof is contemplated as falling within the spirit and scope of the claimed invention, which is set forth in the following claims.

What is claimed is:

1. A gaming machine for conducting a wagering game by a player, comprising:

a display for displaying a wagering-game outcome having a plurality of symbols arranged in an array, the array including a plurality of paylines for indicating symbol combinations in the array, the player being required to play all of the plurality of paylines in exchange for a minimum wager amount;

a credit indicator for indicating a number of available credits for making a wager amount; and a controller in communication with the display and the credit indicator, wherein in response to the number of available credits being less than the minimum wager amount, the controller causing the display to display a group of player options that allows the player to select a disposition for the available credits, the group of player options including a reduced-payline option to play less than all of the plurality of paylines for a subsequent wagering-game outcome.

2. The gaming machine of claim 1, wherein the minimum wager amount corresponds to a wager of one credit on each of the plurality of paylines.

3. The gaming machine of claim 1, further including wager-amount-selection buttons, one of the wager-amount-selection buttons corresponding to the minimum wager amount, the other wager-amount-selection buttons corresponding to wager amounts higher than the minimum wager amount.

4. The gaming machine of claim 3, wherein the wager amounts for the other wager-amount-selection buttons are different credit multiples for each of the plurality of paylines.

5. The gaming machine of claim 1, wherein the minimum wager amount is equally applied to the plurality of paylines.

6. The gaming machine of claim 1, wherein the group of player options is displayed to the player on the display in a popup window.

7. The gaming machine of claim 1, wherein the group of player options includes a wagering event that permits the player to wager the available credits for a result of either (i) a win of an amount that provides the player with the minimum wager amount or (ii) a loss of the available credits.

8. The gaming machine of claim 1, wherein the group of player options includes at least two of (i) a cash out option, (ii) an insert-additional-credits option, (iii) a wagering-event option, and (iv) the reduced-payline option.

9. The gaming machine of claim 8, wherein the wagering-event option provides the player with an opportunity to win just enough credits to cause the available credits to equal the minimum wager amount.

10. The gaming machine of claim 8, wherein the reduced-payline option provides the player at least one selectable option for wagering all of the available credits on at least one payline.

11. The gaming machine of claim 8, wherein the reduced-payline option allows the player to select a number of credits per payline, and wherein a number of active paylines corresponds to the player's selection.

12. The gaming machine of claim 11, further comprising a plurality of payline indicators, the plurality of payline indicators configured to indicate the active paylines.

13. The gaming machine of claim 3, wherein the wager-amount-selection buttons are push buttons.

14. A method of conducting a wagering game on a gaming machine, the wagering game having a plurality of symbols arranged in an array and including a plurality of paylines indicating symbol combinations in the array, the method comprising the acts of:

in a first play of the wagering game, requiring a player to wager a minimum wager amount corresponding to all of the plurality of paylines by using an input device of the gaming machine;

displaying, on one or more display devices of the gaming machine, a plurality of symbols randomly arranged in the array;

determining an outcome of the first play of the wagering game using one or more processors of the gaming machine;

in response to the outcome of the first play being a winning outcome, providing an award to the player; and in response to at least one of the one or more processors determining that a player's available credits are less than the minimum wager amount corresponding to the plurality of paylines and prior to a second play of the wagering game, displaying, on at least one of the one or more display devices of the gaming machine, a group of player options for allowing the player to select a disposition for the player's available credits, the group of player options including an option to play less than all paylines for the second play of the wagering game.

15. The method of claim 14, wherein the group of player options includes at least one wagering-event option.

16. The method of claim 14, wherein the group of player options includes a wagering event that permits the player to wager the player's available credits for a result of either (i) a win of an amount of credits that provides the player with the minimum wager amount or (ii) a loss of the available credits.

17. The method of claim 14, further comprising the act of conducting the second play of the wagering game with less than all of the paylines, and using payline indicators to indicate a portion of the plurality of paylines as being active.

18. A method of conducting a wagering game for a human player on a gaming machine, the wagering game having a plurality of symbols arranged in an array and including a plurality of paylines indicating symbol combinations in the array, the method comprising the acts of:

in a first play of the wagering game, requiring a player to wager a minimum wager amount corresponding to a wager on all of the plurality of paylines by using an input device of the gaming machine;

determining an outcome of the first play of the wagering game using one or more processors of the gaming machine;

displaying, on one or more display devices of the gaming machine, the determined outcome of the first play of the wagering game;

in response to the outcome being a winning outcome in the first play of the wagering game, providing an award to the player; and in response to at least one of the one or more processors determining that a player's available credits are less than the minimum wager amount corresponding to the plurality of paylines and prior to a second play of the wagering game, providing, by displaying a popup window on at least one of the one or more display devices of the gaming machine, a player with at least the options to (i) cash out the player's available credits and (ii) wager the player's available credits on a reduced number of paylines in the second play.

19. The method of claim 18, further comprising the act of, prior to the second play of the wagering game, allowing the player to select a number of paylines less than the plurality of paylines.

20. The method of claim 18, wherein the player's available credits are applied equally to each of the reduced number of paylines on a wager-per-line basis that is equivalent to the available credits.

* * * * *